Jan. 11, 1944.   H. F. MORSE   2,338,731
CIRCUIT CONTROLLER
Filed Nov. 19, 1942
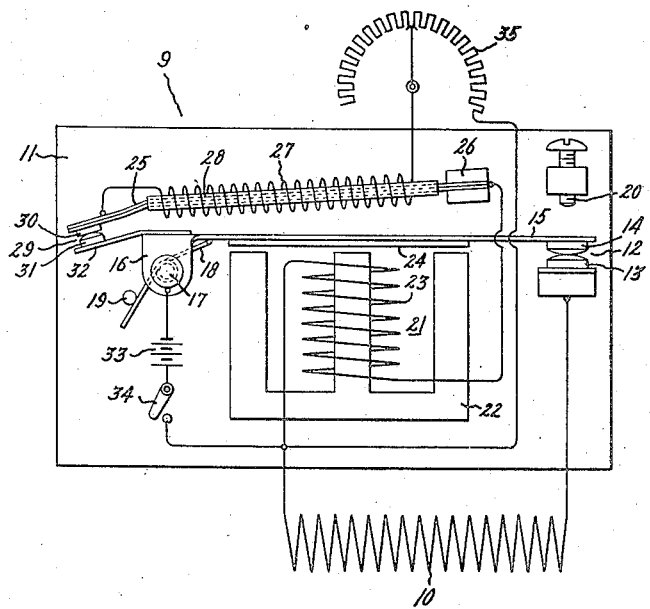
Inventor:
Harold F. Morse,
by Harry E. Dunham
His Attorney.

Patented Jan. 11, 1944

2,338,731

UNITED STATES PATENT OFFICE 2,338,731

CIRCUIT CONTROLLER

Harold F. Morse, Southport, Conn., assignor to General Electric Company, a corporation of New York Application November 19, 1942, Serial No. 466,098

7 Claims. (Cl. 200—88)

This invention relates to a circuit controller, more particularly to a controller for controlling a circuit in accordance with temperature changes, and it has for its object the provision of an improved device of this character, which is simple in construction, inexpensive to make, and which is durable and efficient in its operation.

More particularly, this invention relates to a circuit controller of the thermal relay type which controls a load circuit in accordance with thermal changes in the device itself; and it is especially useful in controlling a load circuit both responsively to its own thermal operating characteristics, and also in accordance with ambient temperature changes. It is well suited to control the temperature in electrically heated blankets, aviator's uniforms and the like where it is desired to hold a close temperature in spite of wide variations in the ambient temperature.

In accordance with this invention, the controller is provided with a load circuit control switch arm which is biased to a first controlling position and which is forced to a second controlling position by a suitable actuator, such as an electromagnet. The operation of the electromagnet is controlled by a thermostat which is provided with local heating means. The energization of the heating means and also that of the electromagnet are controlled by a second switch that is jointly under the control of the thermostat and the switch arm. Each time the contacts of the second switch close, the electromagnet is energized to move the load switch from the first to the second controlling position, and the thermostat is heated to subsequently open the second switch when the thermostat attains a predetermined high temperature; when this occurs, both the heating means for the thermostat and the electromagnet are deenergized, and as a result, the load switch arm returns to its first position under the influence of its biasing means, and heat is removed from the thermostat to permit it to cool and reclose the second switch to repeat the cycle.

The parts are constructed and arranged so that when the thermostat closes the contacts of the second switch to operate the switch arm t.: the second position, the switch arm operates the second switch to increase the contact pressure; and when the thermostat separates the contacts of the second switch to permit the switch arm to return to its first position, the switch arm operates the second switch quickly to separate the contacts. Therefore, arcing at the contacts is prevented in both opening and closing movements.

For a more complete understanding of this invention, reference should be had to the accompanying drawing in which the single figure is an elevation of a circuit controller embodying this invention, and illustrating diagrammatically a load circuit controlled by the controller.

Referring to the drawing, this invention has been shown in one form as applied to a controller 9 for controlling a load circuit, which includes an electric heater 10. The heater 10 may be an electric blanket or an aviator's uniform or other device in which it is desired to hold a substantially constant temperature, irrespective of variations in the temperature of the ambient.

The controller 9 comprises a supporting base or panel 11 formed of any suitable electrically insulating material, such as a phenol condensation product. It further comprises a load switch 12 having a fixed contact 13 rigidly secured to the switch panel, and a relatively movable contact 14. The movable contact 14 is mounted upon one end of an elongated switch arm 15 which extends transversely across the face of the panel, and has its other end pivotally mounted on the panel; the latter end, as shown, is provided with depending tabs 16 which are pivotally mounted upon a fixed pivot member 17 that is supported by the panel. Also, mounted upon the pivot 17 is a spring 18 having one end bearing on a fixed abutment 19 on the panel, and its other end bearing on the other side of the switch arm 15 so as to bias the switch arm in a counter-clockwise direction, as viewed in the figure, to separate the contacts 13 and 14. A suitable adjustable stop 20 is provided to limit the counter-clockwise movement of the switch arm.

The switch arm 15 is actuated to close the switch 12 by means of a suitable electromagnet 21 having an E-shaped core 22 and an energizing coil 23 mounted upon the central leg of the core; the magnet further comprises an armature member 24 which is rigidly secured to the underside of the switch arm, as shown.

The controller further comprises an elongated bimetallic thermostat bar 25 having its righthand end, as viewed in the drawing, anchored to a suitable fixed support 26 mounted on the panel 11. The opposite end of the bimetallic bar is free to move up and down responsively to temperature changes in the bar, the bar moving upwardly responsively to increases in temperature and downwardly responsively to decreases in temperature. A suitable local heater 27 is wrapped about the thermostatic element 25 in order to apply heat to it so as to elevate its temperature. This heater has one end, its left-hand end, as viewed in the drawing, electrically connected with the bimetallic element, while the remainder of the heater is electrically insulated from the bimetallic element by means of an insulating strip 28.

The bimetallic bar 25 and the switch arm 15 jointly control a second switch 29 having a movable contact 30 mounted upon the movable end of the bimetallic bar and a movable contact 31 mounted upon an extension 32 of the switch arm 15. The extension 32 is formed of a relatively soft spring material so that it has considerable resiliency.

This second switch 29 controls the energization of the actuating magnet 21 and also controls the energization of the local heating means 27. As shown, when these contacts are closed the electromagnet energizing coil 23 is electrically connected to a suitable source of electrical supply 33 by a circuit which may be traced from the lower terminal of the supply source 33 through a suitable manually controlled switch 34, the energizing coil of the magnet 23, thence through the bimetallic bar 25, the closed contacts 30 and 31, the extension 32, and thence through one of the lugs 16 to the other side of the supply source. The energizing circuit for the heater 27 will be completed from the lower terminal of the supply source through the closed switch 34, a suitable regulating resistance 35, thence through the heater 27, the closed contacts 30 and 31, and the lug 16 to the other side of the supply source.

The load switch 12 functions to control the connections between the heater 10 and the supply source 33. It will be observed that when these contacts are closed, an energizing circuit is completed for the heater 10 from the lower terminal of the supply source, through the switch 34, thence through the heater 10, the closed contacts 13 and 14, the switch arm 15, and the lug 16 to the other terminal of the supply source.

The operation of the circuit controller is as follows: With the control switch 34 open and the entire system deenergized, the switch arm 15 will be held against its stop 20 by means of the spring 18 so that the switch 12 is opened; the switch 29, however, will be closed because the thermostat is cold and it is in its downward position. Now, if the switch 34 be closed, the energizing circuits for the electromagnet 21 and the heater 27, previously described, will be closed through the closed switch 29. At once the electromagnet will attract its armature 24 and close the switch 12 which will energize the load circuit including the heater 10, as previously described. This movement of the switch arm, of course, will increase greatly the pressure of the contacts 30 and 31 whereby they are firmly held together, the strip 32 being stressed by this operation.

Also, the heater 27 will apply heat to the bimetallic element 25, which when it attains a predetermined high temperature will move upwardly. During the first part of this movement the extension 32 will cause the contact 31 to follow the contact 30, but eventually the thermostat 25 will separate these contacts. At once, the electromagnet 21 will be deenergized which will permit the spring 18 to quickly move the switch arm 15 up against its stop 20; the arm while it is thus moved will quickly move the contact 31 away from the contact 30. When the contacts 30 and 31 separate, the heater 27 will be deenergized. This allows the thermostat to cool and when it cools to a predetermined low temperature, it will move the contact 30 into engagement with the contact 31 to repeat the cycle. In this way the thermostat alternately energizes and deenergizes the heater 10, and regulates the energy supplied to it, and thereby its tmperature. The temperature that is maintained is set by the rheostat 35.

It will be observed that when the switch contacts 30 and 31 are opened by the thermostat the resulting movement of the switch arm 15 will operate to quickly separate them, whereas when they are moved to closed position the switch arm 15 will operate at once to increase the contact pressure. In both cases, therefore, arcing is reduced to a minimum degree.

The controller of this invention is particularly useful in controlling a heater 10 which is subjected to varying ambient temperatures, such as in an electric blanket or aviator's uniform, in that it will compensate for ambient temperature variations so as to hold a substantially uniform temperature. It will be observed that with a fixed rheostat position 35, if the ambient temperature drops, the time for heating the thermostat 25 to open the switch 29 will increase, whereas the time required for it to cool to reclose the switch will decrease. In this way, the proportion of time that the switch is closed to the time that it is open is increased, whereby the amount of energy fed to the heater 10 is increased so as to hold its temperature level in spite of the reduction in the ambient temperature; conversely, if the ambient temperature increases, less time will be required to increase the temperature of the bimetallic strip to open the switch and more time will be required for it to cool to close. Therefore, the energy fed into the heated device 10 will decrease so that it will hold the temperature level in spite of the increases in the ambient temperature.

As pointed out previously, the temperature that is maintained in the heater 10 is adjusted by the rheostat 35. When adjusted for maximum current in the auxiliary bimetal heater 27, this heater quickly will heat the strip 25 to open the switch 29 and will cause maximum parting of the contacts of the switch, thereby requiring more time to cool the strip to reclose the switch 29. This, of course, will hold a lower temperature in heater 10. Conversely, when the rheostat is adjusted for minimum current in the heater 27, a much longer time will be required to open the switch 29, and a much less time required to reclose it. This will increase the temperature of heater 10.

The rheostat 35 can be arranged to control the current in the auxiliary bimetal heater 27 so that the switch 29 is held permanently open while the ambient temperature is above a predetermined value; then when the ambient temperature falls to this predetermined value, the device will automatically begin to function. For example, in the case of an aviator's uniform, the aviator may at the start of a flight close the switch 34 and set the rheostat for 50° F. ambient. From then on he need pay no attention to the control, for when the ambient falls to 50° F. the control automatically will begin to function.

While I have shown and described a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A circuit controller comprising a switch for controlling a load circuit, a switch arm for operating said switch between first and second controlling positions, a second switch having a pair of cooperating contacts, one of which is operated by said switch arm, control means controlled by said second switch arranged when the contacts thereof are closed to operate said switch arm from one of said positions to the other and said switch arm when so operated biasing said pair of contacts together with greater force, a thermostat for operating the second of said pair of contacts, means for heating said thermostat responsively to the closing of said pair of contacts so as to cause it to operate said second contact to separate said pair to cause the heating means to cease heating said thermostat, whereby it cools and recloses said pair of contacts, and means for moving said switch arm to the other of said positions whenever said pair of contacts are opened.

2. A circuit controller comprising a first set of cooperating contacts, a switch arm for operating said contacts, a second set of cooperating contacts, one contact of which is controlled by said switch arm, a thermally responsive device controlling the other contact of said second set, control means controlled by said second set when in closed position for operating said switch arm to operate the first set of contacts and said arm when so operated biasing said second set of contacts together with a greater force, and means for heating said thermally responsive device when said second set are closed to cause it to open said second set when heated to a predetermined high temperature.

3. A circuit controller comprising a movable switch arm carrying a first contact and a second contact, a third contact fixed and cooperating with said first contact, means biasing said switch arm to an open position to separate said first and third contacts, a thermostat, a fourth contact carried by said thermostat cooperating with said second contact, and said thermostat holding said second and fourth contacts closed while said switch arm moves from said open position to close said first and third contacts, operating means for said switch arm moving it to close said first and third contacts when said second and fourth contacts are closed and releasing said switch arm to permit it to return to said open position when said second and fourth contacts are opened, and means for heating said thermostat energized when said second and fourth contacts are closed to cause said thermostat to move to separate said second and fourth contacts, whereupon the heat is cut off from said thermostat to allow it to cool to reclose said second and fourth contacts to repeat the cycle.

4. A circuit controller comprising a switch, a switch arm for operating said switch between first and second controlling positions, means biasing said switch arm to one of said positions, a second switch having a pair of cooperating contacts, one of which is operated by said switch arm, an electromagnet energized by said second switch when its contacts are closed to operate said switch arm from said one position to the other and said switch arm when so operated biasing said pair of contacts together with greater force, a thermostat for operating the second of said pair of contacts, and means for heating said thermostat responsively to the closing of said pair of contacts so as to cause it to operate said second contact to open said pair to cause the deenergization of said electromagnet, and also the heating means to cease heating said thermostat to permit it to cool and thereby reclose said pair of contacts to repeat the cycle.

5. A circuit controller comprising an electromagnet, an operating arm, an armature for said electromagnet in said arm, a pivotal mounting for said arm located between its ends, first and second contacts mounted on the two ends of said arm, the second having a flexible connection with its end, a third contact fixed in position to engage said first contact, a stop spaced from said third contact for limiting the movement of said arm to an open position away from said third contact, a fourth contact cooperating with said second contact, a thermostat carrying said fourth contact, a heater for heating said thermostat, energizing circuits for said electromagnet and said heater controlled by said second and fourth contacts so that when they are closed said electromagnet is energized to operate said arm to close said first and third contacts and so that said heater is energized, said flexible connection holding said second and fourth contacts closed while said arm is moving to close said first and third contacts, and said heater when energized heating said thermostat to separate said second and fourth contacts to deenergize said magnet and thereby permit said arm to open said first and third contacts, and also to deenergize said heater whereby said thermostat cools to reclose said second and fourth contacts to repeat the cycle.

6. A circuit controller comprising a load controlling switch having a fixed contact and a movable contact cooperating with it, an electromagnet, an arm, an armature for said magnet on said arm, means adjacent one end of said arm pivotally supporting it, said movable contact being mounted on the other end of said arm, means biasing said arm to separate said contacts, a stop limiting the movement of said arm away from said fixed contact, a flexible extension on said one end of said arm, a control contact on said flexible extension, a thermostat bar extending along the length of said arm, a fixed support for the end of said bar that is adjacent said load switch, a control contact on the other end of said thermostat bar cooperating with said first-named control contact, control means controlled by said control contacts for energizing and deenergizing said electromagnet and heating means for said thermostat so that when said contacts are closed said heater and electromagnet are energized, the electromagnet thereupon operating said arm away from said stop to close said load switch, and moving said flexible extension to increase the contact pressure of said control contacts, and said heater applying heat to said thermostat bar to cause it to move to separate said conrol contacts when it attains a predetermined high temperature so as to control said control means to deenergize said electromagnet to permit said arm to open said load switch, and also deenergize said heating means to permit said thermostat to cool and move to reclose said control contacts to repeat the cycle.

7. A circuit controller comprising a switch for controlling a load circuit, a switch arm for operating said switch between first and second controlling positions to effect different electrical conditions in said load circuit, an electromagnet, a thermostat, heating means for locally heating said thermostat, a second switch having cooperating contacts controlling said heating means and said electromagnet jointly controlled by said switch arm and said thermostat so that each time the contacts thereof close said electromagnet is energized to operate said switch arm from one position to another and said heating means is energized to heat said thermostat to open said contacts when it attains a predetermined high temperature and said switch arm when being so moved by said elecromagnet forcing said contacts together with greater force, and said contacts when opened by said thermostat deenergizing said electromagnet and said heating means to release said switch arm and to shut off the heat to said thermostat to thereby permit it to cool and reclose said contacts to repeat the cycle, and a spring biasing said switch arm toward said other position, the switch arm when so released quickly separating said contacts.

HAROLD F. MORSE.